United States Patent
Chen

(10) Patent No.: US 11,115,706 B2
(45) Date of Patent: Sep. 7, 2021

(54) METHOD, CLIENT, AND TERMINAL DEVICE FOR SCREEN RECORDING

(71) Applicant: Wangsu Science & Technology Co., Ltd., Shanghai (CN)

(72) Inventor: Yanpeng Chen, Shanghai (CN)

(73) Assignee: Wangsu Science & Technology Co., Ltd., Shanghai (CN)

( * ) Notice: Subject to any disclaimer, the term of this patent is extended or adjusted under 35 U.S.C. 154(b) by 0 days.

(21) Appl. No.: 16/717,861

(22) Filed: Dec. 17, 2019

(65) Prior Publication Data

US 2020/0382828 A1   Dec. 3, 2020

Related U.S. Application Data

(63) Continuation of application No. PCT/CN2019/090324, filed on Jun. 6, 2019.

(30) Foreign Application Priority Data

Apr. 24, 2019  (CN) .......................... 201910334746.9

(51) Int. Cl.
*H04N 21/433* (2011.01)
*H04N 21/4147* (2011.01)
(Continued)

(52) U.S. Cl.
CPC ..... *H04N 21/4334* (2013.01); *H04N 21/4147* (2013.01); *H04N 21/4307* (2013.01); *H04N 21/47217* (2013.01)

(58) Field of Classification Search
CPC ......... H04N 21/4334; H04N 21/47217; H04N 21/4307; H04N 21/4147
(Continued)

(56) References Cited

U.S. PATENT DOCUMENTS 8,214,338 B1 * 7/2012 Kirchhoff ............. G06F 16/113
                                                  707/693
9,161,006 B1 * 10/2015 Wang ....................... G06T 1/60
(Continued)

FOREIGN PATENT DOCUMENTS

CN    101502089 A    8/2009
CN    102055949 A    5/2011
(Continued)

OTHER PUBLICATIONS

Wangsu Science & Technology Co., International Search Report, Chinese Application No. PCT/CN2019/090324, dated Apr. 24, 2019, 4 pgs.
(Continued)

*Primary Examiner* — Thai Q Tran
*Assistant Examiner* — Stephen R Smith
(74) *Attorney, Agent, or Firm* — USCH Law, PC

(57) ABSTRACT

A method, client, and terminal device for screen recording are provided, and the method includes: enabling a screen recording data synthesizing module (401) when a screen recording instruction is received (101); inputting an encoded audio data of a player into the screen recording data synthesizing module (401) for superposition, to obtain a merged audio data (102); and inputting a video data of the player into the screen recording data synthesizing module (401), and merging the video data with the merged audio data, to obtain a screen recording data (103). In the present disclosure, all the audio and video data in a live broadcasting
(Continued)

scenario can be completely recorded to ensure the integrity of the live broadcasting scenario.

16 Claims, 4 Drawing Sheets

(51) Int. Cl.
    *H04N 21/43*     (2011.01)
    *H04N 21/472*     (2011.01)

(58) Field of Classification Search
    USPC .............. 386/291, 279; 370/260; 379/202.01; 707/693
    See application file for complete search history.

(56) References Cited

U.S. PATENT DOCUMENTS

| | | | | |
|---|---|---|---|---|
| 2005/0180341 | A1* | 8/2005 | Nelson | H04L 65/1083 370/260 |
| 2010/0020954 | A1* | 1/2010 | Gilg | G10L 19/008 379/202.01 |
| 2010/0166384 | A1* | 7/2010 | Adimatyam | H04N 5/76 386/291 |
| 2015/0156552 | A1* | 6/2015 | Wayans | H04N 21/4223 386/230 |
| 2016/0210222 | A1 | 7/2016 | Wyld et al. | |
| 2017/0109122 | A1* | 4/2017 | Schmidt | A63F 13/65 |
| 2017/0257598 | A1* | 9/2017 | Reshef | H04N 7/147 |
| 2018/0268870 | A1* | 9/2018 | Chen | H04N 21/6587 |
| 2018/0284981 | A1* | 10/2018 | Lu | G06F 3/0488 |

FOREIGN PATENT DOCUMENTS

| | | | |
|---|---|---|---|
| CN | 102420010 | A * | 4/2012 |
| CN | 102420010 | A | 4/2012 |
| CN | 105227998 | A | 1/2016 |
| CN | 105635712 | A | 6/2016 |
| CN | 106101767 | A | 11/2016 |
| CN | 106101797 | A | 11/2016 |
| CN | 106331306 | A | 1/2017 |
| CN | 106792108 | A | 5/2017 |
| CN | 107872605 | A | 4/2018 |
| CN | 108184079 | A | 6/2018 |
| CN | 108495141 | A | 9/2018 |
| CN | 108881767 | A | 11/2018 |
| CN | 109246480 | A | 1/2019 |
| CN | 109327741 | A | 2/2019 |
| EP | 1784025 | A2 | 5/2007 |
| WO | WO 2013123499 | A1 | 8/2013 |

OTHER PUBLICATIONS

Wangsu Science & Technology Co., Chinese Office Action, CN Application No. 201910334746.9, dated Mar. 23, 2020, 7 pgs.
Wangsu Science & Technology Co., Ltd., CN201910334746.9, Second Office Action, dated Nov. 12, 2020, 8 pgs.
Zhou, Yaoying, "Research and Implementation of Multitask Screen Recording Software for Mac OS X," Masters Dissertation, Dalian University of Technology, Mar. 15, 2017, 75 pgs.

* cited by examiner

METHOD, CLIENT, AND TERMINAL DEVICE FOR SCREEN RECORDING

CROSS-REFERENCE TO RELATED APPLICATIONS

The present disclosure is a continuation of PCT Patent application No. PCT/CN2019/090324, filed on Jun. 6, 2019, entitled "METHOD, CLIENT, AND TERMINAL DEVICE FOR SCREEN RECORDING", which is incorporated herein by reference in its entirety. The above PCT patent application claims priority to Chinese Patent Application No. 201910334746.9, entitled "METHOD, CLIENT, AND TERMINAL DEVICE FOR SCREEN RECORDING" filed on Apr. 24, 2019, which is incorporated herein by reference in its entirety.

TECHNICAL FIELD

The present disclosure relates to streaming media technologies, and in particular, to a method, client, and terminal device for screen recording.

BACKGROUND

With the development of Internet technologies, real-time audio-video communication is increasingly favored by people, and more and more people watch a live video or a video on demand (VOD) via networks. To facilitate a user in watching a previous live video on demand, a screen usually needs to be recorded (referred to as screen recording) while live broadcasting.

During screen recording, a screenshot of an on-going interface is usually taken and used as video frame data, and then the video frame data is encoded. At the same time, original audio data is obtained, and then the original audio data is encoded. Then, the encoded video frame data and the encoded original audio data are combined into screen recording data.

During the implementation the present disclosure, the inventor finds at least the following problems in the existing technologies:

Usually, a plurality of audio play units are simultaneously enabled in a same player in a live broadcasting scenario such as online education or microphone connection, but in the existing method for screen recording, it is difficult to obtain the audio data of all the audio play units in the live broadcasting scenario. Therefore, in the live broadcasting scenario with a plurality of audio play units, it is difficult to record all the audio and video data in the live broadcasting scenario by using a conventional method for screen recording.

SUMMARY

In order to resolve the problems in the existing technologies, embodiments of the present disclosure provide a method, client, and terminal device for screen recording. The technical solutions are as follows.

A first aspect of the present disclosure provides a method for screen recording, and the method is performed on a client, and includes: enabling a screen recording data synthesizing module when a screen recording instruction is received; inputting an encoded audio data of a player into the screen recording data synthesizing module for superposition, to obtain a merged audio data; and inputting a video data of the player into the screen recording data synthesizing module, and merging the video data with the merged audio data, to obtain a screen recording data.

In an example, before the step of inputting an encoded audio data of a player into the screen recording data synthesizing module for superposition, the method further includes: enabling an audio collecting and encoding module to collect an audio data of each audio play unit in the player and periodically encode the audio data, to obtain the encoded audio data of the player.

In an example, before the step of a screen recording instruction is received, the method further includes: obtaining an audio play parameter of each audio play unit in the player when the player is initialized; and enabling the audio collecting and encoding module corresponding to each audio play unit based on the audio play parameter of each audio play unit and a preset audio unified encoding parameter.

In an example, the method further includes: enabling an audio collecting and encoding management module when the player is initialized; controlling, via the audio collecting and encoding management module, all the audio collecting and encoding modules to simultaneously collect the audio data of corresponding audio play units when the screen recording instruction is received; and controlling, via the audio collecting and encoding management module, all the audio collecting and encoding modules to simultaneously stop collecting the audio data of the corresponding audio play units when an end instruction is received.

In an example, the client further enables a screen recording data input module when the screen recording instruction is received; and the step of inputting an encoded audio data of a player into the screen recording data synthesizing module for superposition, to obtain a merged audio data includes: inputting the encoded audio data corresponding to each audio play unit into the screen recording data synthesizing module one by one via the screen recording data input module; and superimposing the encoded audio data corresponding to all the audio play units via the screen recording data synthesizing module to obtain the merged audio data.

In an example, the client further enables a screen recording data output module when the screen recording instruction is received; and the step of inputting a video data of the player into the screen recording data synthesizing module, and merging the video data with the merged audio data, to obtain a screen recording data includes: inputting the video data into the screen recording data synthesizing module via the screen recording data input module; and merging the video data with the merged audio data via the screen recording data synthesizing module, and generating the screen recording data via the screen recording data output module.

In an example, the method further includes: enabling a synthesizing management module when the audio play unit is initialized; and determining an on-going screen recording state via the synthesizing management module, and performing a corresponding processing based on the screen recording state, where the screen recording state includes a normal state, a waiting timeout state, a cancel state, and an end state.

In an example, the method further includes: enabling a video collecting and encoding module based on a preset video collecting parameter to collect the video data of the player when the screen recording instruction is received.

A second aspect of the present disclosure provides a client for screen recording, and the client is configured to: enable a screen recording data synthesizing module when a screen recording instruction is received; input an encoded audio data of a player into the screen recording data synthesizing module for superposition to obtain a merged audio data; and input a video data of the player into the screen recording data synthesizing module, and merge the video data with the merged audio data, to obtain a screen recording data.

In an example, the client is further configured to: enable an audio collecting and encoding module to collect an audio data of each audio play unit in the player and periodically encode the audio data, to obtain the encoded audio data of the player.

In an example, the client is further configured to: obtain an audio play parameter of each audio play unit in the player when the player is initialized; and enable the audio collecting and encoding module corresponding to each audio play unit based on the audio play parameter of each audio play unit and a preset audio unified encoding parameter.

In an example, the client is further configured to: enable an audio collecting and encoding management module when the player is initialized; control, via the audio collecting and encoding management module, all the audio collecting and encoding modules to simultaneously collect the audio data of corresponding audio play units when the screen recording instruction is received; and control, via the audio collecting and encoding management module, all the audio collecting and encoding modules to simultaneously stop collecting the audio data of the corresponding audio play units when an end instruction is received.

In an example, the client further enables a screen recording data input module when the screen recording instruction is received; and the client is further configured to: input the encoded audio data corresponding to each audio play unit into the screen recording data synthesizing module one by one via the screen recording data input module; and superimpose the encoded audio data corresponding to all the audio play units via the screen recording data synthesizing module, to obtain the merged audio data.

In an example, the client further enables a screen recording data output module when the screen recording instruction is received; and the client is further configured to: input the video data into the screen recording data synthesizing module via the screen recording data input module; and merge the video data with the merged audio data via the screen recording data synthesizing module, and generate the screen recording data via the screen recording data output module.

In an example, the client is further configured to: enable a synthesizing management module when the player is initialized; and determine an on-going screen recording state via the synthesizing management module, and perform a corresponding processing based on the screen recording state, where the screen recording state includes a normal state, a waiting timeout state, a cancel state, and an end state.

In an example, the client is further configured to: enable a video collecting and encoding module based on a preset video collecting parameter to collect the video data of the player when the screen recording instruction is received.

A third aspect of the present disclosure provides a terminal device for screen recording, including the client described in the second aspect.

Beneficial effects of the technical solutions provided in the embodiments of the present disclosure are as follows:

In the embodiments of the present disclosure, the screen recording data synthesizing module is enabled when the screen recording instruction is received; the encoded audio data of the player is input into the screen recording data synthesizing module for superposition, to obtain the merged audio data; and the video data of the player is input into the screen recording data synthesizing module, and the video data and the merged audio data are merged to obtain the screen recording data. In this way, the client first superimposes the audio data of all the audio play units in the player in a live broadcasting scenario via the screen recording data synthesizing module to obtain the merged audio data, and then merges the merged audio data with the video data, so that all the audio data and video data in the live broadcasting scenario can be recorded, thereby ensuring the integrity of the audio and video data in the live broadcasting scenario.

BRIEF DESCRIPTION OF THE DRAWINGS

In order to clarify the technical solutions in the embodiments of the present disclosure, the following briefly describes the accompanying drawings required for describing the embodiments. It is evident that the accompanying drawings in the following description show merely some embodiments of the present disclosure, and those skilled in the art may still derive other drawings from these accompanying drawings without creative efforts.

DETAILED DESCRIPTION

In order to make the objects, technical solutions, and advantages of the present disclosure clearer, the following further describes the embodiments of the present disclosure in detail with reference to the accompanying drawings.

Embodiments of the present disclosure provide a method for screen recording, and the method is applicable to a client with a screen recording function. A player may be further installed on a terminal device on which the client is installed, and the terminal device may be a mobile terminal or another terminal device. A user may record content of a live video via the client when watching the live video via the player on the terminal device. An application scenario of the present embodiment may be as follows: The user may enable the client to record screen when watching a live video via the player on the terminal device. The client enables a screen recording data synthesizing module after receiving a screen recording instruction. The client inputs encoded audio data corresponding to all audio play units that participate in a live broadcasting into the screen recording data synthesizing module for superposition, to obtain a merged audio data; and the client then inputs a video data collected from the player into the screen data recording synthesizing module, and merges the previously obtained merged audio data with the video data, to finally obtain a screen recording data.

Figure 1:
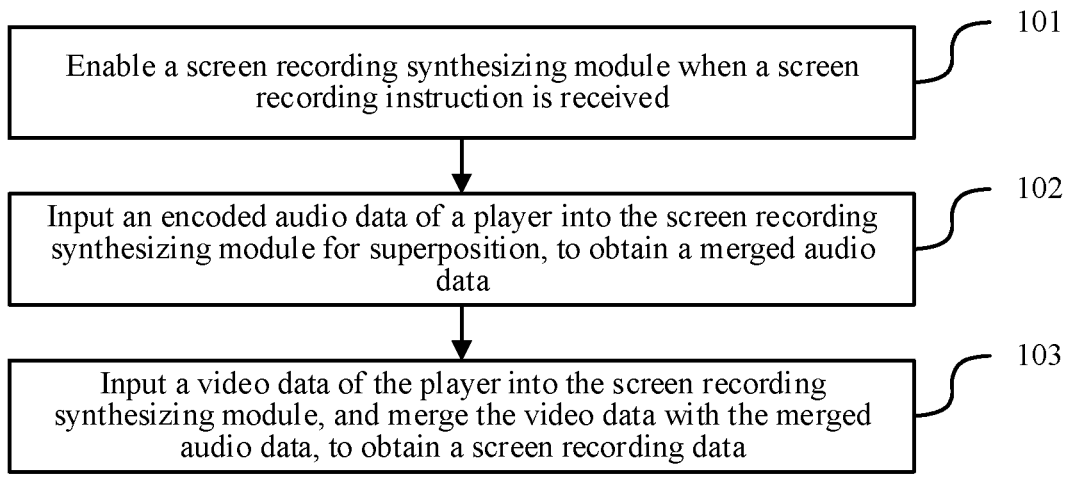
FIG. 1 is a flowchart of a method for screen recording according to an embodiment of the present disclosure.

A screen recording process shown in FIG. 1 may be described in detail with reference to specific embodiments as follows:

In step 101, a screen recording data synthesizing module is enabled when a screen recording instruction is received.

During implementation, a client and a player are installed on a terminal device in advance, and all the following methods are performed by the client. For ease of understanding, in the present embodiment, an application client (App) of an iOS terminal device is used as an example for description. The client enables the screen recording data synthesizing module based on an AVMutableComposition interface in an iOS Framework AVFoundation framework when the screen recording instruction is received.

Audio data with different audio parameters may not be directly superimposed, and the audio data may be encoded via a same audio parameter which facilitates a merging processing. Therefore, corresponding processing may be as follows: an audio collecting and encoding module is enabled to collect the audio data of each audio play unit included in the player and periodically encode the audio data, so as to obtain the encoded audio data of the player.

During implementation, more than one audio play unit in the player may be playing the audio data at the same time when a user watches a live video on the iOS terminal device, and different audio play units have different audio play parameters so that the audio data collected from the different audio play units may not be merged. Therefore, the client may collect the audio data of the different audio play units via the audio collecting and encoding module, and then encode the audio data via a same audio parameter, to obtain the encoded audio data with the same audio parameter.

For example, the audio collecting and encoding module may collect the audio data via Pulse Code Modulation (PCM) encoding, and then encode the collected audio data (PCM data) via a libmp3lame library, to obtain the encoded audio data (MP3 data) in an MP3 format. In a collecting and encoding process, the audio collecting and encoding module may further temporarily buffer the audio data (PCM data) or the encoded audio data (MP3 data), and the audio collecting and encoding module may use an absolute timestamp for creating the audio data (PCM data) or the encoded audio data (MP3 data) as a unified identifier, to record a temporary buffer path of the audio data (PCM data) or the encoded audio data (MP3 data). In a screen recording process, the audio collecting and encoding module does not need to encode the audio data (PCM data) in real time and may periodically (for example, 500 ms) determine whether the collected audio data (PCM data) is sufficient, and encode the audio data (PCM data) if the audio data is sufficient, or otherwise may wait for another 500 ms to a next period.

In order to collect the audio data of the audio play units with different audio play parameters and uniformly encode the collected audio data, corresponding processing may be as follow: the audio play parameter of each audio play unit in the player is obtained when the player is initialized; and the audio collecting and encoding module corresponding to each audio play unit is enabled based on the audio play parameter of each audio play unit and a preset audio unified encoding parameter.

During implementation, the client may enable the audio collecting and encoding module in advance, so that the client can immediately collect the audio data after receiving the screen recording instruction. As described above, the player installed on the iOS terminal device may have a plurality of audio play units, and in the screen recording process, the plurality of audio play units may generate a plurality of paths of the audio data at the same time. Therefore, a corresponding audio collecting and encoding module may be enabled for each audio play unit. When any audio play unit in the player of the iOS terminal device performs an initialization operation, the client obtains the audio play parameter of the audio play unit, and then enables the audio collecting and encoding module corresponding to the audio play unit based on the obtained audio play parameter and the preset audio unified encoding parameter (for example, the libmp3lame library described above). In this way, when the screen recording starts, the audio collecting and encoding module may collect the audio data from the corresponding audio play unit via the PCM encoding based on the audio play parameter, and then encode the collected audio data via the audio unified encoding parameter. When each audio play unit in the player performs the initialization operation, the client may enable a corresponding audio collecting and encoding module for the audio play unit. The audio collecting and encoding module is always in a waiting state before the screen recording starts, and starts collecting and encoding only after the screen recording starts. All the audio collecting and encoding modules use the same audio unified encoding parameter. In this way, an encoded audio data with a same audio parameter can be obtained after the audio data collected from different audio play units is encoded. It should be noted that the client of the iOS terminal device collects and encodes the audio data of the player in the above manner, and may also collect a video data of the player and encode the video data. For a process of collecting and encoding the video data, reference may be made to the following descriptions.

The player may have a plurality of audio play units. Therefore, the client may enable a plurality of audio collecting and encoding modules. In order to uniformly manage these audio collecting and encoding modules, corresponding processing may be as follows: an audio collecting and encoding management module is enabled when the player is initialized; all the audio collecting and encoding modules are controlled to simultaneously collect the audio data of corresponding audio play units via the audio collecting and encoding management module when the screen recording instruction is received; and all the audio collecting and encoding modules are controlled to simultaneously stop collecting the audio data of the corresponding audio playback units controlling via the audio collecting and encoding management module when an end instruction is received.

During implementation, when a first audio play unit of the player on the iOS terminal device performs an initialization operation, the client further enables the audio collecting and encoding management module while enabling the audio collecting and encoding module for the audio play unit, and connects the audio collecting and encoding module with the audio collecting and encoding management module, so that the audio collecting and encoding management module may manage the audio collecting and encoding module. After enabling the audio collecting and encoding modules corresponding to other audio play units, the client also connects these audio collecting and encoding modules with the audio collecting and encoding management module. In this way, the audio collecting and encoding management module may manage all the audio collecting and encoding modules.

When the screen recording starts, the audio collecting and encoding management module may enable the audio collecting and encoding module to collect and encode the audio data of the audio play unit. When the screen recording ends, the audio collecting and encoding management module may clear a temporary buffer data or other data of the PCM data or the MP3 data generated by the audio collecting and encoding module in the above collecting and encoding process.

In step 102, the encoded audio data of the player is input into the screen recording data synthesizing module for superposition, to obtain a merged audio data.

During implementation, after the screen recording data synthesizing module is enabled, the client may obtain the encoded audio data corresponding to each audio play unit in the player on the iOS terminal device, input the encoded audio data into the screen recording data synthesizing module, and superimpose the encoded audio data to generate the merged audio data.

The client may further enable a screen recording data input module when the screen recording instruction is received, and corresponding processing of step 102 may be specifically as follows: the encoded audio data corresponding to each audio play unit is input into the screen recording data synthesizing module one by one via the screen recording data input module; and the encoded audio data corresponding to all the audio play units is superimposed via the screen recording data synthesizing module, to obtain the merged audio data.

Figure 2:
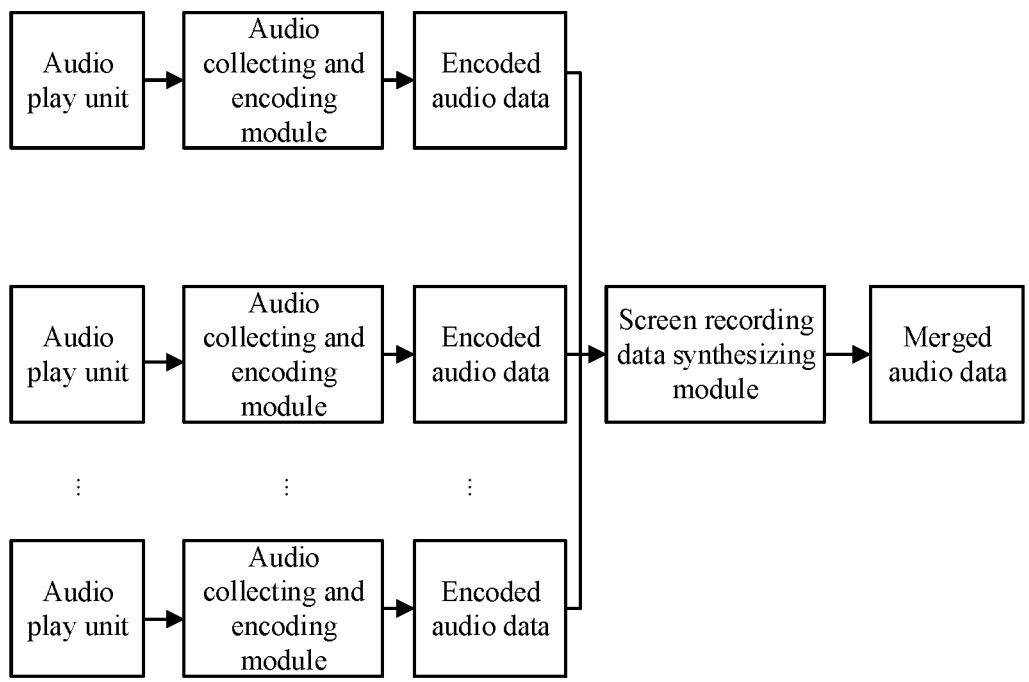
FIG. 2 is a processing flowchart of generating a merged audio data in the method for screen recording according to an embodiment of the present disclosure.

During implementation, when the screen recording instruction is received, the client enables, based on the iOS Framework AVFoundation framework, the screen recording data input module via an AVURLAsset interface, and the screen recording data synthesizing module via the AVMutableComposition interface. As shown in FIG. 2, the client obtains the encoded audio data corresponding to all the audio play units via the screen recording data input module, and then inputs the encoded audio data into the screen recording data synthesizing module one by one by taking a timestamp 0 as a start point. The screen recording data synthesizing module superimposes all the encoded audio data input by the screen recording data input module, to obtain the merged audio data.

Step 103: A video data of the player is input into the screen recording data synthesizing module, and the video data and the merged audio data are merged, to obtain a screen recording data.

During implementation, the client inputs a collected video data of the player into the screen recording data synthesizing module after obtaining the merged audio data, and the screen recording data synthesizing module merges the merged audio data with the video data, to obtain the screen recording data only including one path of audio data and one path of video data.

The client may further enable a screen recording data output module when the screen recording instruction is received, and corresponding processing of step 103 may be specifically as follows: the video data is input into the screen recording data synthesizing module via the screen recording data input module; and the video data is merged with the merged audio data via the screen recording data synthesizing module, and the screen recording data is generated via the screen recording data output module.

Figure 3:
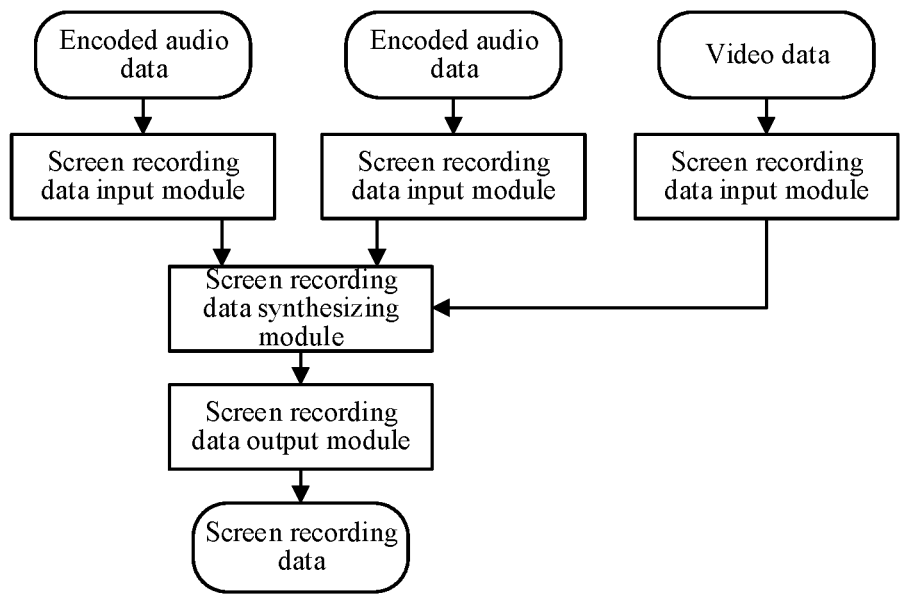
FIG. 3 is a processing flowchart of generating a screen recording data in the method for screen recording according to an embodiment of the present disclosure.

During implementation, as shown in FIG. 3, when the screen recording instruction is received, the client enables, based on the iOS Framework AVFoundation framework, the screen recording data input module via the AVURLAsset interface, the screen recording data synthesizing module via the AVMutableComposition interface, and the screen recording data output module via an AVAssetExportSession interface. The client continues to input the collected video data into the screen recording data synthesizing module via the screen recording data input module after the screen recording data synthesizing module generates the merged audio data. Then the client merges the video data with the merged audio data via the screen recording data synthesizing module, and finally exports the generated screen recording data to a specified path via the screen recording data output module.

There are certain differences between audio encoding efficiency and video encoding efficiency, and an audio encoding process and a video encoding process are performed asynchronously. In order to uniformly manage the audio collecting and encoding module and a collecting and video encoding module, corresponding processing may be as follows: a synthesizing management module is enabled when the player is initialized; and an on-going screen recording state is determined via the synthesizing management module and a corresponding processing is performed based on the screen recording state, where the screen recording state includes a normal state, a waiting timeout state, a cancel state, and an end state.

During implementation, when the first audio play unit of the player on the iOS terminal device performs an initialization operation, the client further enables the synthesizing management module while enabling the audio collecting and encoding module corresponding to the audio play unit, and connects the synthesizing management module with the audio collecting and encoding module, so that the synthesizing management module may manage the audio collecting and encoding module. After enabling the audio collecting and encoding module, the video collecting and encoding module, and the screen recording data synthesizing module which correspond to other audio play units, the client also connects the audio collecting and encoding module, the video collecting and encoding module, and the screen recording data synthesizing module with the synthesizing management module. In this way, the synthesizing management module may manage the audio collecting and encoding module, the video collecting and encoding module, and the screen recording data synthesizing module based on the on-going screen recording state. The screen recording state includes a normal state, a waiting timeout state, a cancel state, and an end state.

When the screen recording state is a waiting timeout state, it indicates that in a process of synthesizing the screen recording data via the screen recording synthesizing module, after any audio collecting and encoding module completes the collection and encoding of all the audio data on the audio play unit corresponding to the audio-video collecting and encoding module, the audio collecting and encoding module enters a waiting state, and the synthesizing management module starts timing. If other audio collecting and encoding modules also enter the waiting state within a preset waiting time range, the synthesizing management module re-starts timing until all the audio collecting and encoding modules enter the waiting state. If no other audio collecting and encoding modules enter the waiting state within the preset waiting time range, the synthesizing management module controls all the audio collecting and encoding modules, the video collecting and encoding module, and the screen recording data synthesizing module to exit on-going operations, and feed back exception log information to the client.

The screen recording state may be considered as a cancel state in two cases: (1) An end operation is triggered when a minimum duration requirement for the screen recording duration is not satisfied after the screen recording starts. (2) A cancel operation is triggered when the screen recording starts and does not end normally or abnormally. The cancel operation means that not storing any data, empting all resources, feeding back an exception log, and exiting. In a process of synthesizing the screen recording data via the screen recording data synthesizing module, if the client receives a screen recording cancel instruction, the synthesizing management module controls all the audio collecting and encoding modules, the video collecting and encoding module, and the screen recording data synthesizing module to stop on-going operations, and feeds back log information to the client.

The end state of the screen recording state may be classified into a normal ending and an abnormal ending. The normal ending means that a screen recording ending operation is manually triggered between an upper limit and a lower limit of screen recording duration threshold, and disk space does not reach a remaining threshold. The abnormal ending means that during the screen recording, in a process of synthesizing the screen recording data via the screen recording data synthesizing module, the synthesizing management module monitors information such as a storage space and the screen recording duration of the iOS terminal device in real time, and when a storage space is insufficient, a screen recording duration upper limit is exceeded, or another situation occurs, the synthesizing management module controls all the audio collecting and encoding modules and the video collecting and encoding module to stop on-going operations, and controls the screen recording data synthesizing module to superimpose the encoded audio data having been collected, and then merges the encoded audio data having been collected with the video data to generate the screen recording data.

The client may further enable a video collecting and encoding module to collect a video data, and corresponding processing may be as follows: the video collecting and encoding module is enabled based on a preset video collecting parameter to collect the video data of the player when the screen recording instruction is received.

During implementation, the video collecting parameter is preset on the client, and the client enables the video collecting and encoding module based on the preset video collecting parameter when the screen recording instruction is received, and then collects the video data via the video collecting and encoding module. The video collecting parameter preset on the client includes a video data output path, a collection resolution, a collection frequency, a video frame pixel format, a video encoding mode, and the like. For example, the client enables the video collecting and encoding module when the screen recording instruction is received. The video collecting and encoding module may move content rendered within a screen range and redraws the content by taking a preset resolution of 1280×720, 30 FPS, and a 32-bit BGRA as the video frame pixel format, to form a binary steam of an original image, and then encodes the binary stream by using H.264 to obtain the video data, and temporarily stores the video data in a content of a video file path Screen Record/Video.

It should be noted that the collection resolution may optionally be other resolution such as 800×480, or a screen resolution of the terminal device is used as the collection resolution by default. In addition to a specified frame rate, an upper limit threshold and a lower limit threshold of the frame rate may also be set when setting the collection frequency. Other encoding mode such as VP8, VP9, or HEVC may also be used as the video encoding mode.

In addition, as described above, the client of the iOS terminal device may separately collect and encode the audio data and the video data of the player at the same time. Certainly, it may be understood that the client of the iOS terminal device may first encode the audio data and then encode the video data after collecting the audio data and the video data of the player, or may first encode the video data and then encode the audio data. This is not specifically limited in the present disclosure.

In the embodiments of the present disclosure, the screen recording data synthesizing module is enabled when the screen recording instruction is received; the encoded audio data of the player is input into the screen recording data synthesizing module for superposition, to obtain the merged audio data; and the video data of the player is input into the screen recording data synthesizing module, and is merged with the merged audio data, to obtain the screen recording data. In this way, the client first superimposes the audio data of all the audio play units in the player in a live broadcasting scenario via the screen recording data synthesizing module to obtain the merged audio data, and then merges the merged audio data with the video data, so that all the audio and video data in the live broadcasting scenario can be recorded, thereby ensuring the integrity of the audio and video data in the live broadcasting scenario.

Figure 4:
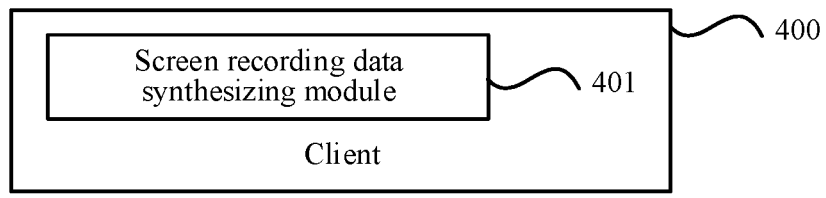
FIG. 4 is a schematic structural diagram of a client for screen recording according to an embodiment of the present disclosure.

Based on a same technical concept, an embodiment of the present disclosure further provides a client for screen recording. As shown in FIG. 4, the client 400 is configured to:

enable a screen recording data synthesizing module 401 when a screen recording instruction is received;

input an encoded audio data of a player into the screen recording data synthesizing module 401 for superposition, to obtain a merged audio data; and input a video data of the player into the screen recording data synthesizing module 401, and merge the video data with the merged audio data, to obtain a screen recording data.

Figure 5:
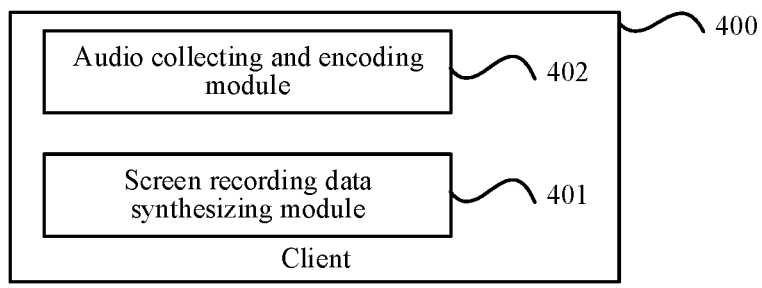
FIG. 5 is another schematic structural diagram of the client for screen recording according to an embodiment of the present disclosure.

Alternatively, as shown in FIG. 5, the client 400 is further configured to:

enable an audio collecting and encoding module 402 to collect an audio data of each audio play unit included in the player and periodically encode the audio data, to obtain the encoded audio data of the player.

Alternatively, the client 400 is further configured to:

obtain an audio play parameter of each audio play unit in the player when the player is initialized; and enable the audio collecting and encoding module 402 corresponding to each audio play unit based on the audio play parameter of each audio play unit and a preset audio unified encoding parameter.

Figure 6:
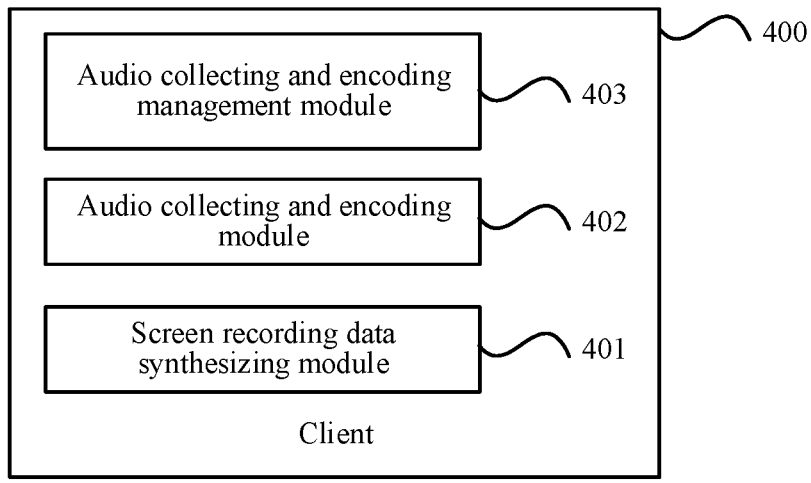
FIG. 6 is another schematic structural diagram of the client for screen recording according to an embodiment of the present disclosure.

Alternatively, as shown in FIG. 6, the client 400 is further configured to:

enable an audio collecting and encoding management module 403 when the player is initialized;

control, via the audio collecting and encoding management module 403, all the audio collecting and encoding modules 402 to simultaneously collect the audio data of corresponding audio play units when the screen recording instruction is received; and control, via the audio collecting and encoding management module 403, all the audio collecting and encoding modules 402 to simultaneously stop collecting the audio data of the corresponding audio play units when an end instruction is received.

Figure 7:
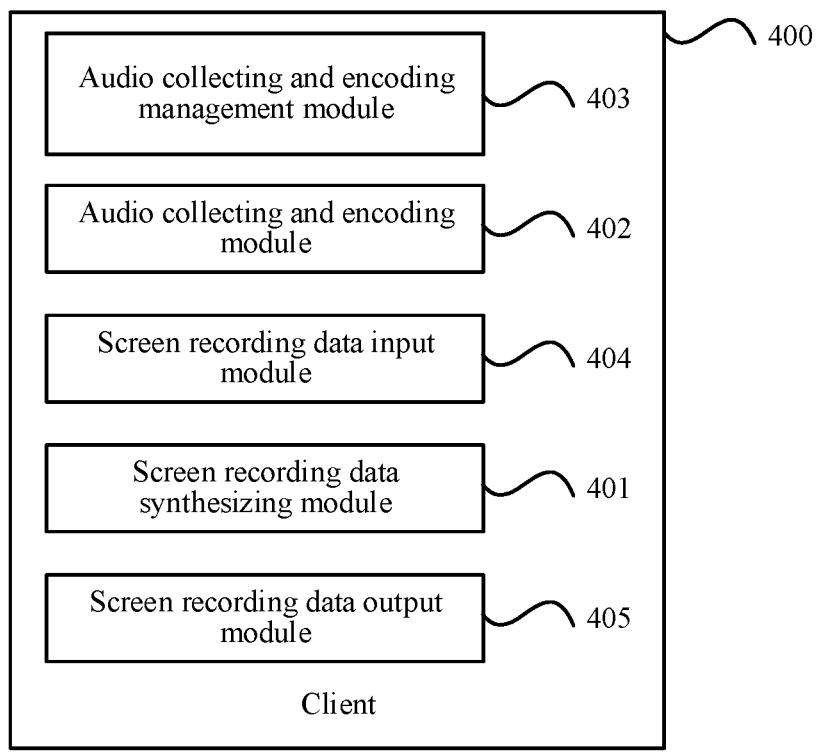
FIG. 7 is another schematic structural diagram of the client for screen recording according to an embodiment of the present disclosure.

Alternatively, as shown in FIG. 7, the client 400 further enables a screen recording data input module 404 when the screen recording instruction is received.

The client 400 is further configured to:

input the encoded audio data corresponding to each audio play unit into the screen recording data synthesizing module 401 one by one via the screen recording data input module 404; and superimpose the encoded audio data corresponding to all the audio play units via the screen recording data synthesizing module 401, to obtain the merged audio data.

Alternatively, as shown in FIG. 7, the client 400 further enables a screen recording data output module 405 when the screen recording instruction is received.

The client 400 is further configured to:

input the video data into the screen recording data synthesizing module 401 via the screen recording data input module 404; and merge the video data with the merged audio data via the screen recording data synthesizing module 401, and generate the screen recording data via the screen recording data output module 405.

Figure 8:
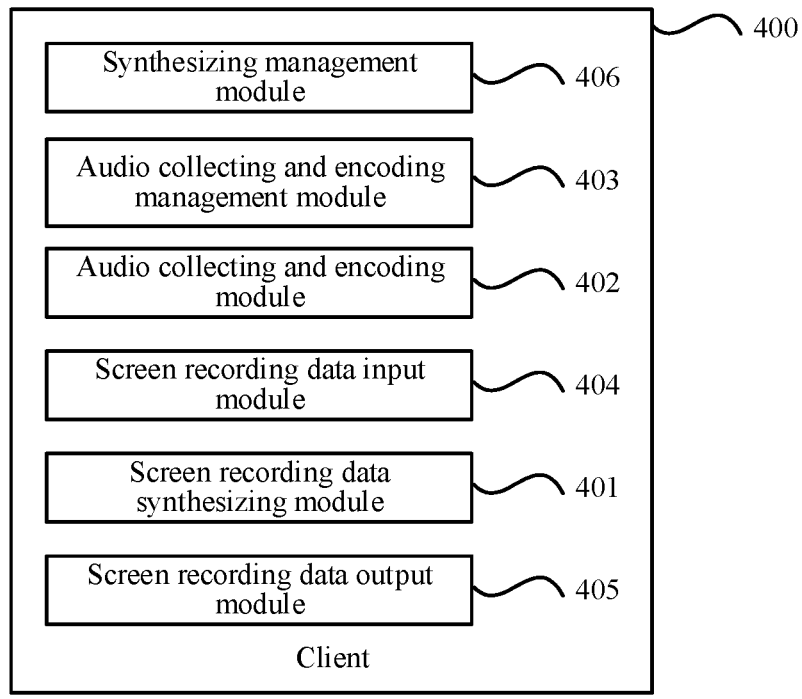
FIG. 8 is another schematic structural diagram of the client for screen recording according to an embodiment of the present disclosure.

Alternatively, as shown in FIG. 8, the client 400 is further configured to:

enable a synthesizing management module 406 when the player is initialized; and determine an on-going screen recording state via the synthesizing management module 406, and perform a corresponding processing based on the screen recording state, where the screen recording state includes a normal state, a waiting timeout state, a cancel state, and an end state.

Figure 9:
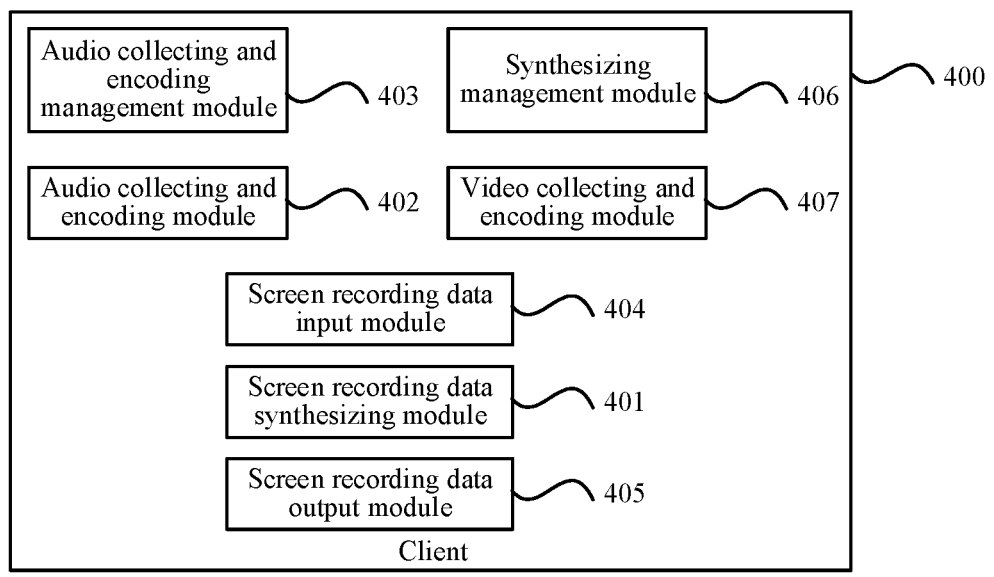
FIG. 9 is another schematic structural diagram of the client for screen recording according to an embodiment of the present disclosure.

Alternatively, as shown in FIG. 9, the client 400 is further configured to:

enable a video collecting and encoding module 407 based on a preset video collecting parameter to collect the video data of the player when the screen recording instruction is received.

It should be noted that, it is described by taking division of each above function module as an example when the client for screen recording provided in the above embodiment implementing the screen recording. In actual application, the above functions may be allocated to different function modules according to requirements, that is, an internal structure of the client is divided into different function modules to complete all or a part of functions in the above descriptions. Meanwhile, the client for screen recording and the method for screen recording provided in the above embodiments are based on the same concept, thus a detailed implementation of the client for screen recording may refer to the method embodiments, which are not detailed herein.

Based on a same technical concept, an embodiment of the present disclosure further provides a terminal device for screen recording, including the above client, and further including at least one media player.

Based on the above descriptions of the embodiments, those skilled in the art may clearly understand that each embodiment may be implemented by software in addition to a necessary general hardware platform, or certainly may be implemented by hardware. Based on such an understanding, the technical solutions essentially or the part contributing to the existing technologies may be implemented in a form of a software product. The software product is stored in a storage medium, such as a ROM/RAM, a hard disk, or an optical disc, and includes several instructions for instructing a computer device (which may be a personal computer, a server, a network device, or the like) to perform the methods described in the embodiments or some parts of the embodiments.

The above-described are only preferably embodiments of the present disclosure, but are not used to impose a limitation to the present disclosure. Any amendment, equivalent substitution and improvement made within the spirit and principle of the present disclosure shall be included in the protection scope of the present disclosure.

What is claimed is:

1. A method for screen recording, performed on a client, comprising:

obtaining an audio play parameter of each audio play unit of a plurality of audio play units in a player when the player is initialized;

receiving a screen recording instruction;

for each respective audio play unit of the plurality of audio play units of the player, collecting respective audio data of the respective audio play unit based on the audio play parameter of the respective audio play unit and periodically encoding the respective audio data based on a preset audio unified encoding parameter to obtain respective encoded audio data in response to the screen recording instruction;

superposing encoded audio data of the plurality of audio play units to obtain merged audio data; and merging video data of the player with the merged audio data to obtain screen recording data;

wherein the method further comprises:

determining an on-going screen recording state, and performing a corresponding processing based on the screen recording state, wherein the screen recording state at least includes a waiting timeout state;

wherein after an operation of audio collecting and encoding performed on all audio data of any one of the plurality of audio play units is completed, the operation of audio collecting and encoding enters a waiting state;

wherein determining the on-going screen recording state comprises:

starting timing when the operation of audio collecting and encoding enters a waiting state; and determining that the screen recording state is the waiting timeout state if no operation of audio collecting and encoding performed on any other audio play unit enters the waiting state within a preset waiting time range.

2. The method according to claim 1, further comprising:

managing audio collecting and encoding when the screen recording instruction is received, to simultaneously collect audio data of the plurality of audio play units; and managing the audio collecting and encoding when an end instruction is received, to simultaneously stop collecting the audio data of the plurality of the audio play units.

3. The method according to claim 1, wherein the screen recording state further includes a normal state, a cancel state, and an end state.

4. The method according to claim 3, wherein the screen recording state is determined as the cancel state in a case that an end operation is triggered when a minimum duration requirement for a screen recording duration is not satisfied after screen recording starts, or, a cancel operation is triggered when the screen recording starts and does not end normally or abnormally.

5. The method according to claim 4, wherein when the screen recording state is determined as the cancel state, performing the corresponding processing based on the screen recording state comprises:
  stopping on-going operations of audio collecting and encoding, video collecting and encoding and screen recording data synthesizing when receiving a screen recoding cancel instruction, and feeding back information of exception log to the client.

6. The method according to claim 3, wherein the end state includes a normal ending and an abnormal ending; and when the end state is the abnormal ending, performing a corresponding processing based on the screen recording state comprises:
  stopping on-going operations of audio collecting and encoding and video collecting and encoding, superposing encoded audio data to obtain merged audio data, and merging the video data with the merged audio data to obtain screen recording data.

7. The method according to claim 1, further comprising:
  collecting video data of the player based on a preset video collecting parameter when the screen recording instruction is received.

8. The method according to claim 1, wherein when the screen recording state is determined as the waiting timeout state, performing the corresponding processing based on the screen recording state comprises:
  stopping on-going operations of audio collecting and encoding, video collecting and encoding and screen recording data synthesizing, and feeding back information of exception log to the client.

9. A terminal device for screen recording, comprising:
  at least one processor; and
  memory communicatively coupled to the at least one processor;
  wherein the memory stores instructions which, when executed by the at least one processor, cause the at least one processor to:
  obtain an audio play parameter of each audio play unit of a plurality of audio play units in a player when the player is initialized;
  receive a screen recording instruction;
  for each respective audio play unit of the plurality of audio play units of the player, collect respective audio data of the respective audio play unit based on the audio play parameter of the respective audio play unit and periodically encode the respective audio data based on a preset audio unified encoding parameter to obtain respective encoded audio data in response to the screen recording instruction;
  superpose encoded audio data of the plurality of audio play units to obtain merged audio data; and
  merge video data of the player with the merged audio data to obtain screen recording data;
  wherein the at least one processor is further configured to:
  determine an on-going screen recording state, and perform a corresponding processing based on the screen recording state, wherein the screen recording state at least includes a waiting timeout state;
  wherein after an operation of audio collecting and encoding performed on all audio data of any one of the plurality of audio play units is completed, the operation of audio collecting and encoding enters a waiting state;
  wherein the at least one processor is configured to determine the on-going screen recording state by:
  starting timing when the operation of audio collecting and encoding enters a waiting state; and
  determining that the screen recording state is the waiting timeout state if no operation of audio collecting and encoding performed on any other audio play unit enters the waiting state within a preset waiting time range.

10. The terminal device according to claim 9, wherein the at least one processor is further configured to:
  manage audio collecting and encoding when the screen recording instruction is received, to simultaneously collect the audio data of the plurality of audio play units; and
  manage the audio collecting and encoding when an end instruction is received, to simultaneously stop collecting the audio data of the plurality of the audio play units.

11. The terminal device according to claim 9,
  wherein the screen recording state further includes a normal state, a cancel state, and an end state.

12. The terminal device according to claim 11, wherein the screen recording state is determined as the cancel state in a case that an end operation is triggered when a minimum duration requirement for a screen recording duration is not satisfied after screen recording starts, or, a cancel operation is triggered when the screen recording starts and does not end normally or abnormally.

13. The terminal device according to claim 12, wherein when the screen recording state is determined as the cancel state, the at least one processor is further configured to:
  stop on-going operations of audio collecting and encoding, video collecting and encoding and screen recording data synthesizing when receiving a screen recoding cancel instruction, and feed back information of exception log to the client.

14. The terminal device according to claim 11, wherein the end state includes a normal ending and an abnormal ending; and when the end state is the abnormal ending, the at least one processor is further configured to:
  stop on-going operations of audio collecting and encoding and video collecting and encoding, superpose encoded audio data to obtain merged audio data, and merge the video data with the merged audio data to obtain the screen recording data.

15. The terminal device according to claim 9, wherein the at least one processor is further configured to:
  collect video data of the player based on a preset video collecting parameter when the screen recording instruction is received.

16. The terminal device according to claim 9, wherein when the screen recording state is determined as the waiting timeout state, the at least one processor is further configured to:
  stop on-going operations of audio collecting and encoding, video collecting and encoding and screen recording data synthesizing, and feed back information of exception log to the client.

* * * * *